United States Patent
Shu et al.

(10) Patent No.: US 10,295,064 B2
(45) Date of Patent: May 21, 2019

(54) ELECTRONIC EXPANSION VALVE

(71) Applicant: ZHEJIANG SANHUA CO., LTD, Zhejiang (CN)

(72) Inventors: Xiaohui Shu, Zhejiang (CN); Caiyi Zhan, Zhejiang (CN); Qiliang Wang, Zhejiang (CN)

(73) Assignee: ZHEJIANG SANHUA CO., LTD, Zhejiang (CN)

(*) Notice: Subject to any disclaimer, the term of this patent is extended or adjusted under 35 U.S.C. 154(b) by 38 days.

(21) Appl. No.: 15/125,839

(22) PCT Filed: Mar. 19, 2015

(86) PCT No.: PCT/CN2015/074590
§ 371 (c)(1),
(2) Date: Sep. 13, 2016

(87) PCT Pub. No.: WO2015/139647
PCT Pub. Date: Sep. 24, 2015

(65) Prior Publication Data
US 2017/0002931 A1    Jan. 5, 2017

(30) Foreign Application Priority Data

Mar. 19, 2014 (CN) .......................... 2014 1 0101289
Mar. 19, 2014 (CN) .......................... 2014 1 0101878

(51) Int. Cl.
*F16K 1/38* (2006.01)
*F25B 41/06* (2006.01)
(Continued)

(52) U.S. Cl.
CPC ............. *F16K 1/385* (2013.01); *F16K 1/54* (2013.01); *F16K 31/0655* (2013.01);
(Continued)

(58) Field of Classification Search
CPC ...... F16K 1/38; F16K 27/0254; F16K 31/041; F25B 41/062
(Continued)

(56) References Cited

U.S. PATENT DOCUMENTS 5,368,273 A * 11/1994 Dante ..................... F02C 7/232
251/122
5,419,531 A * 5/1995 Hoehn ..................... F16K 1/38
251/122
(Continued)

FOREIGN PATENT DOCUMENTS

CN          2536849 Y       2/2003
CN        101956830 A       1/2011
(Continued)

OTHER PUBLICATIONS

Japanese Office Action dated Mar. 13, 2018 for Japanese application No. 2016-556804.
(Continued)

*Primary Examiner* — Matthew W Jellett
(74) *Attorney, Agent, or Firm* — Ohlandt, Greeley, Ruggiero & Perle, LLP

(57) ABSTRACT

An electronic expansion valve includes an electromagnetic coil, a valve body provided with a valve port, and a valve needle. The valve needle includes a main body section and a first conical surface portion arranged adjacent to the main body section. The valve port includes a straight section portion having equal diameters. When the electromagnetic coil applies a zero pulse, the straight section portion is not in contact with the valve needle, and an intersecting surface of a plane, where a top end of the straight section portion is located, and the valve needle is on the first conical surface portion. With the electronic expansion valve, flow can be precisely adjusted at a low-pulse stage, and during assembly, a position of the 0 pulse can be directly obtained by (Continued)

enlarged portion II adjusting relative positions of the valve needle and the valve port and by using a flow meter.

19 Claims, 13 Drawing Sheets

(51) Int. Cl.
  *F16K 31/06* (2006.01)
  *F16K 1/54* (2006.01)
(52) U.S. Cl.
  CPC .... *F25B 41/062* (2013.01); *F25B 2341/0652* (2013.01); *Y02B 30/72* (2013.01)
(58) Field of Classification Search
  USPC .................................................. 251/122, 903
  See application file for complete search history.

(56) References Cited

U.S. PATENT DOCUMENTS

| | | | | |
|---|---|---|---|---|
| 6,250,602 | B1* | 6/2001 | Jansen | F02K 9/58 251/124 |
| 7,044,434 | B2* | 5/2006 | Brinks | F16K 1/38 251/122 |
| 7,137,612 | B2* | 11/2006 | Baca | F16K 1/38 251/122 |
| 7,854,390 | B2* | 12/2010 | Hayashi | F25B 41/062 236/92 B |
| 8,556,229 | B2* | 10/2013 | Lv | F16K 31/047 251/129.11 |
| 8,763,419 | B2* | 7/2014 | Suganama | F16K 15/18 137/601.14 |
| 9,513,040 | B2 | 12/2016 | Wakisaka et al. | |
| 2008/0111089 | A1* | 5/2008 | Hasunuma | F16K 1/06 251/122 |
| 2009/0020716 | A1* | 1/2009 | Hokazono | F16K 31/047 251/129.11 |
| 2011/0012038 | A1 | 1/2011 | Lv et al. | |
| 2011/0120161 | A1* | 5/2011 | Hayashi | F25B 41/062 62/160 |
| 2014/0283546 | A1* | 9/2014 | Wakisaka | F16K 1/36 62/528 |

FOREIGN PATENT DOCUMENTS

| | | |
|---|---|---|
| CN | 203163367 U | 8/2013 |
| JP | S6173966 U | 5/1986 |
| JP | 2004340260 A | 12/2004 |
| JP | 2007032979 A | 2/2007 |
| JP | 2008032215 A | 2/2008 |
| JP | 3145048 U | 9/2008 |
| JP | 2011021749 A | 2/2011 |
| JP | 2013032849 A | 2/2013 |
| JP | 2013108647 A | 6/2013 |
| JP | 2017142136 A | 8/2017 |
| WO | 2013073531 A1 | 5/2013 |

OTHER PUBLICATIONS

International Search Report dated Jun. 17, 2015 for PCT application No. PCT/CN2015074590.

Japanese Office Action dated Aug. 22, 2017 for Japanese application No. 2016-556804.

Korean Office Action dated May 15, 2018 for Korean application No. 1020167028867.

* cited by examiner

ELECTRONIC EXPANSION VALVE

CROSS-REFERENCED APPLICATIONS

The present application is the national phase of International Application No. PCT/CN2015/074590, titled "ELECTRONIC EXPANSION VALVE", filed on Mar. 19, 2014 which claims the benefit of priorities to Chinese patent application No. 201410101289.6 titled "ELECTRONIC EXPANSION VALVE", filed with the Chinese State Intellectual Property Office on Mar. 19, 2014, and Chinese patent application No. 201410101878.4 titled "ELECTRONIC EXPANSION VALVE", filed with the Chinese State Intellectual Property Office on Mar. 19, 2014, the entire disclosures of which are incorporated herein by reference.

BACKGROUND

1. Field of the Disclosure

The present application relates to the technical field of flow control components, and particularly to an electronic expansion valve.

2. Discussion of the Background Art

In the refrigerating and heating technical field, an electronic expansion valve is a refrigerant flow control component of refrigerating and heating devices, and the working process thereof is generally that: with a coil device power-on or power-off, a valve needle is driven to adjust an opening degree of a valve port so as to accurately adjust a flow of the refrigerant.

In some systems, when the electronic expansion valve is in a fully closed state and loses efficacy, or when a control system breaks down, if a compressor keeps running, a refrigerating circuit may be partially vacuumized and further the compressor and even the whole refrigerating system may be damaged. Therefore, a fully closed and flow allowed electronic expansion valve is gradually used to replace a fully closed and flow unallowed electronic expansion valve in these systems. The so-called "fully closed and flow allowed" means that when the valve port of the electronic expansion valve is closed by the valve needle of the electronic expansion valve, a certain flow is still allowed to pass, thereby effectively avoiding the problem caused by continuous running of the compressor that when the electronic expansion valve is in a fully closed state, the refrigerating system circuit is vacuumized.

In the conventional technology, the fully close and flow allowed electronic expansion valve generally adopts two types of structures: a grooving type and a gap type, which are described hereinafter respectively in conjunction with drawings.

Reference is made to FIGS. 1 and 2. FIG. 1 is a schematic view showing the structure of a valve needle cooperating with a valve port during a valve opening process of a grooving type electronic expansion valve in the conventional technology, and FIG. 2 is a flow curve to which the grooving type electronic expansion valve corresponds.

The so-called grooving type groove means that a groove is cut at a valve port portion of the electronic expansion valve to allow the seal of the valve port to be incomplete. Thus, when the electronic expansion valve is in the fully closed state, a portion between the valve needle and the valve port can not be completely sealed due to the existence of the groove, and there is still a small quantity of fluid flowing through the groove, thereby realizing the object that there is still some flow when the electronic expansion valve is fully closed.

A valve needle 18 is provided with a sealing conical surface 181 and an adjusting conical surface 182. The sealing conical surface 181 is configured to contact with a valve port 17 to realize a seal or a partial seal (FIG. 1 shows the grooving type electronic expansion valve and a valve port portion is provided with a groove to ensure a certain flow, thus the valve needle 18 can not completely seal the valve port). For avoiding the self-locking, a taper angle of the sealing conical surface 181 is generally set to be larger than 45 degrees. As shown in FIG. 1($a$), for obtaining and setting a zero pulse flow valve, a pulse ranging from 0 to X1 is generally used to make the valve needle 18 to fully contact with the valve port 17. The valve needle is in the state of fully closing the valve port, the sealing conical surface 181 is in contact with the valve port 17, and a contacting portion is located on the sealing conical surface 181. A valve port plane P1 where the contacting portion is located is higher than a valve needle plane P2 where a boundary between the sealing conical surface 181 of the valve needle 18 and the adjusting conical surface 182 of the valve needle 18 is located (see an enlarged view of portion I). Thus, it could be understood from FIG. 2 that, a flow value of a 0~X1 pulse section is the zero pulse flow value, and the zero pulse flow value is relevant to a depth of the groove. However, in the actual machining process of the groove, due to difference in hardness of materials and the difference of machining process, the depth of the groove cannot be ensured to be completely the same, and thus the zero pulse flow value can not be completely controlled. Furthermore, a width of the 0~X1 pulse section is relevant to the debugging, an error in a debugging process may make X1 to fluctuate in a range and the error can generally reach 40 pulses, thus adversely affecting an adjusting accuracy of the electronic expansion valve.

Since the taper angle of the sealing conical surface 181 is different from a taper angle of the adjusting conical surface 182, flow change rates are different. During the valve opening process, before an inflection point passing the valve port, that is in a position corresponding to X2 pulse in FIG. 1, the valve port plane P1 where the contacting portion between the seal conical surface 181 and the valve port 17 is located is coincident with the valve needle plane P2 where the boundary between the seal conical surface 181 and the adjusting conical surface 182 is located, as shown in FIG. 1($b$). With the valve needle 18 further moving upward, corresponding positions of the valve needle and the valve port at an X3 pulse are as shown in FIG. 1($c$). At last, the valve port is in a fully opened state which is as shown in FIG. 1($d$). The inflection point between X3 and X4 of the flow curve can be set according to the actual conditions.

According to the flow curve in FIG. 2, the flow change rate corresponding to the pulse section ranging from X1 to X2 is obviously larger than a flow change rate required by the electronic expansion valve, thus this pulse section can not be used in the practical application. Further, since X2 is relevant to X1, the value of X2 is undetermined. Consequently, the zero pulse flow value of the electronic expansion valve with such structure can not be accurately controlled, and due to the difference in valve opening pulse, the flow corresponding to a small opening degree section of 0~X2, which is at a front end of the flow curve, has a low adjusting accuracy, thus the flow adjusting accuracy of the whole valve is low at a low pulse section. Furthermore, when the electronic expansion valve with such structure is in the fully closed state, the seal conical surface 181 is in contact with the valve port, thus an abrasion of the valve needle and the valve port is apt to occur when the electronic expansion valve is fully closed and just opened, and a phenomenon of valve sticking is likely to occur.

Reference is made to FIGS. 3 and 4. FIG. 3 is a structure schematic view showing that a valve needle cooperates with a valve port during a valve opening process of the gap type electronic expansion valve, and FIG. 4 is a flow curve to which the gap type electronic expansion valve corresponds.

The so-called "gap type" means that the valve needle of the electronic expansion valve is provided with an equal diameter section, and a diameter of the equal diameter section is smaller than that of the valve port, thus there is a certain gap when the valve needle cooperates with the valve port, thereby realizing an object that there is still some flow when the electronic expansion valve is fully closed.

A valve needle 19 includes an equal diameter section 191 and an adjusting section 192, the equal diameter section 191 has a cylinder shape, and a connecting position between the equal diameter section 191 and the adjusting section 192 is defined as a valve needle plane P3. A valve port 17 has the same structure as the valve port in the above grooving type electronic expansion valve, and a diameter of the valve port 17 is set to be larger than that of the equal diameter section 191. As shown in FIG. 3(a), when the electronic expansion valve is in the fully closed state, the valve needle plane P3 is lower than a valve port plane P4 where a top portion of the valve port located. There is a certain gap between the equal diameter section 191 and the valve port 17, a zero pulse flow value is ensured by controlling a size of the gap. Therefore, the requirement for the manufacture accuracy of the valve needle and the valve port having such a structure is high. Reference is made to FIG. 4, a position relationship between the valve needle and the valve port corresponding to the X1 pulse is as shown in FIG. 3(b). The valve needle plane P3 is coincident with the valve port plane P4. The width of the 0~X1 pulse section is relevant to a debugging and a manufacture accuracy, and an error during the debugging process may make the X1 to fluctuate in a range and thus the X1 can not completely controlled. In the practical use, the flow value corresponding to 0~X1 pulse keeps unchanged and a value of X1 is undetermined, therefore the 0~X1 section pulse can not be used, thus causes an available pulse section to be decreased. FIGS. 3(c) and 3(d) respectively show the positions of the valve needle with respect to the valve port corresponding to X2 pulse and X3 pulse, and whether there is an inflection point between X2 and X3 of the flow curve or not can be determined according to the practical situation.

It can be seen that, for the fully closed and flow allowed electronic expansion valve in the conventional technology, no matter the grooving type or the gap type, both the zero pulse flows can not be easily and accurately controlled, and a pulse section having an unchanged flow value (a pulse section which can not be fully used) exists in the flow curve, thus a control accuracy of the electronic expansion valve is adversely affected to a certain extent.

Therefore, it is a technical problem urgently to be solved by those skilled in the art to design an electronic expansion valve, which can accurately control the zero pulse flow, allow the flow curve to be exclusive of a section having unchanged flow value, and fully use the small opening degree section of the electronic expansion valve.

Furthermore, under the affect of the design of flow channels inside the electronic expansion valve, a noise may be generated when a fluid passes through the valve port. Therefore, the flow channels of the electronic expansion valve should be specially designed for some middle-grade type and high-grade type machines.

Reference is made to FIG. 15, which is a schematic view showing the structure of a typical electronic expansion valve in the conventional technology.

The electronic expansion valve includes a valve seat 16. A first connecting pipe 14 and a second connecting pipe 15 are fixedly connected to the valve seat 16 respectively. The fluid enters the first connecting pipe 14, flows through a valve port 17' arranged on the valve seat 16, and is discharged from the second connecting pipe 15 (the fluid may also enter the second connecting pipe 15 and be discharged from the first connecting pipe 14).

A housing 6 is fixedly connected to an upper side of the valve seat 16, the housing 6 is sealed by a cover 1, thus a sealed chamber is formed above the valve seat 16. A magnet rotor 8 and a lead screw 7 fixedly connected to the magnet rotor 8 are provided inside the housing 6. A valve needle 18' is further arranged under the lead screw 7. The lead screw 7 cooperates with a nut 9 fixed on the valve seat 16 by a screw thread and can move relative to the nut 9. An electromagnetic coil (not shown in the figure) is sleeved on an outer end of the housing 6, the electromagnetic coil generates a pulse after being energized and drives the magnet rotor 8 to rotate, thus driving the lead screw 7 to rotate. Due to the screw thread fit, a rotating motion of the lead screw 7 is converted into upward and downward motion, which drives the valve needle 18' connected to the lead screw 7 to move upward or downward to get close to or away from the valve port 17' so as to change the opening degree of the valve port 17' and realize the object of adjusting the flow.

For controlling a starting position and a stopping position of the upward and downward motion of the valve needle 18', a stopping mechanism is further provided. The stopping mechanism includes a stopping rod 4 fixed on the lead screw and a stopping portion 2 fixed on the sealing cover 1. A helical spring guide rail 3 is fixed on the stopping portion 2, a sliding ring 5 is helically slidable on the helical guide rail 3, and one end of the sliding ring 5 abuts against the stopping rod 4 so as to realize the stopping object.

As shown in FIG. 16, a lower end portion of the valve port 17' is provided with a flared opening 171'. Although the flared opening 171' can reduce the noise to a certain degree, during the process that the fluid flows through the valve port 17' from the first connecting pipe 14 and reaches the second connecting pipe 15, since an inner diameter of the valve port 17' is much smaller than an inner diameter of the first connecting pipe 14, a flow area may still be suddenly changed when the fluid flows through the valve port 17'. Therefore, the fluid is apt to generate bubbles near the valve port 17', and the bubbles are broken due to squeezing when passing through the valve port 17', thus generating noise.

Therefore, it is a technical issue urgently to be addressed by those skilled in the art to design an electronic expansion valve which can further reduce the noise based on the conventional technology.

SUMMARY

The technical issue to be solved by the present application is to provide an electronic expansion valve which can solve the defections in the conventional technology that a zero pulse flow can not be easily accurately controlled and a small opening degree section pulse can not be fully used.

For solving the above technical issue, an electronic expansion valve according to the present application includes:

an electromagnetic coil configured to apply a pulse to allow the electronic expansion valve operate in response to the pulse;

a valve body provided with a valve port; and a valve needle configured to cooperate with the valve port to adjust a flow of the electronic expansion valve.

The valve needle includes a main body section and a first conical surface portion which is arranged adjacent to the main body section, the valve port includes a straight section portion having equal diameters; and when the electromagnetic coil applies a zero pulse, the straight section portion is not in contact with the valve needle, and an intersecting surface of a plane, where a top end of the straight section portion is located, and the valve needle is on the first conical surface portion.

The electronic expansion valve according to the present application can precisely adjust the flow at a low pulse stage. During assembly, a zero pulse position can be directly obtained by adjusting a relative position of the valve needle and the valve port and by using a flow meter. The flow accuracy at the zero pulse merely depends on a test accuracy of the flow meter and is not relevant to the manufacture accuracy of the valve needle and valve port, which can tremendously improve the consistency of the zero pulse flow and greatly reduce the manufacture cost. In a flow curve of the electronic expansion valve, there is no section with unchanged flow value, therefore flow adjustment can be performed by fully using a small pulse area, so that an adjustment range of the electronic expansion valve is enlarged.

Preferably, the valve port further includes a first valve port conical surface and a second valve port conical surface which are arranged at two ends of the straight section portion respectively, extend in a direction away from an axial direction of the straight section portion and have inner diameters increased gradually.

Preferably, an intersecting surface of a plane, where a boundary line between the first valve port conical surface and the straight section portion is located, and the valve needle is on the first conical surface portion.

Preferably, the largest diameter of the first conical surface portion is larger than an inner diameter of the straight section portion.

Preferably, the valve needle includes the main body section, a first valve needle conical surface and a second valve needle conical surface, which are adjacently arranged in sequence; the first valve needle conical surface has a taper angle larger than a taper angle of the second valve needle conical surface; and an intersecting surface of the plane, where the top end of the straight section portion is located, and the valve needle is on the second valve needle conical surface.

Preferably, the valve port further includes a first valve port conical surface and a second valve port conical surface which are arranged at two ends of the straight section portion respectively, extend in a direction away from an axial direction of the straight section portion and have inner diameters increased gradually; and an intersecting surface of a plane, where a boundary line between the first valve port conical surface and the straight section portion is located, and valve needle is on the second valve needle conical surface.

Preferably, the largest diameter of the second valve port conical surface is larger than an inner diameter of the straight section portion.

Preferably, the valve port includes a straight section portion and a conical surface portion, an intersecting surface of the plane, where the top end of the straight section portion of the valve port is located, and the valve needle is on the second valve needle conical surface, and the largest diameter of the second valve needle conical surface is larger than an inner diameter of the straight section portion of the valve port.

Preferably, the valve port includes a straight section portion and a conical surface portion, and an intersecting surface of a plane, where the top end of the straight section portion of the valve port is located, and the valve needle is on the first conical surface portion.

Preferably, the valve port includes a first valve port conical surface, a straight section portion and a second valve port conical surface, which are arranged in sequence; and a height of the first valve port conical surface and a height of the straight section portion meet the relationship: $2 \leq d1/d2 \leq 10$, where $d1$ is the height of the first valve port conical surface and $d2$ is the height of the straight section portion.

Preferably, a height of the second valve port conical surface and the height of the straight section portion meet the relationship: $2 \leq d3/d2 \leq 10$, where $d3$ is the height of the second valve port conical surface and $d2$ is the height of the straight section portion.

Preferably, the first valve port conical surface and the second valve port conical surface are respectively arranged at two ends of the straight section portion, extend in a direction away from an axial direction of the straight section portion, and have inner diameters increased gradually.

Preferably, a taper angle of the first valve port conical surface is within a range of $50°\pm20°$.

Preferably, the taper angle of the first valve port conical surface ranges from $50°$ to $70°$.

Preferably, a taper angle of the second valve port conical surface is within a range of $36°\pm20°$.

Preferably, the valve needle includes a first conical surface and a second conical surface; the first conical surface cooperates with the second conical surface and meets the relationship: $\alpha1-\beta1=20°\pm10°$, where $\alpha1$ is the taper angle of the first valve port conical surface of the valve port and $\beta1$ is the taper angle of the first conical surface of the valve needle.

Preferably, the valve seat is provided with a first chamber and a second chamber, the first chamber is adjacent to the first valve port conical surface, and an inner diameter of the first valve port conical surface is equal to the largest inner diameter of the first valve port conical surface.

Preferably, an inner diameter of the first chamber is approximately equal to an inner diameter of the second chamber, and a cross sectional area of the first chamber and a cross sectional area of the straight section portion meet the relationship: $2 \leq S1/S2 \leq 5$, where $S1$ is the cross sectional area of the first chamber and $S2$ is the cross sectional area of the straight section portion.

Preferably, during a process of the valve needle moving away from the valve port by at least 250 pulses, a flow channel having an annular cross section is formed between the first valve port conical surface and the first conical surface.

DETAILED DESCRIPTION OF THE PREFERRED EMBODIMENT

For those skilled in the art better understanding the technical solutions of the present application, the present application is further described in details in conjunction with drawings and specific embodiments.

Embodiment 1

Figure 1:
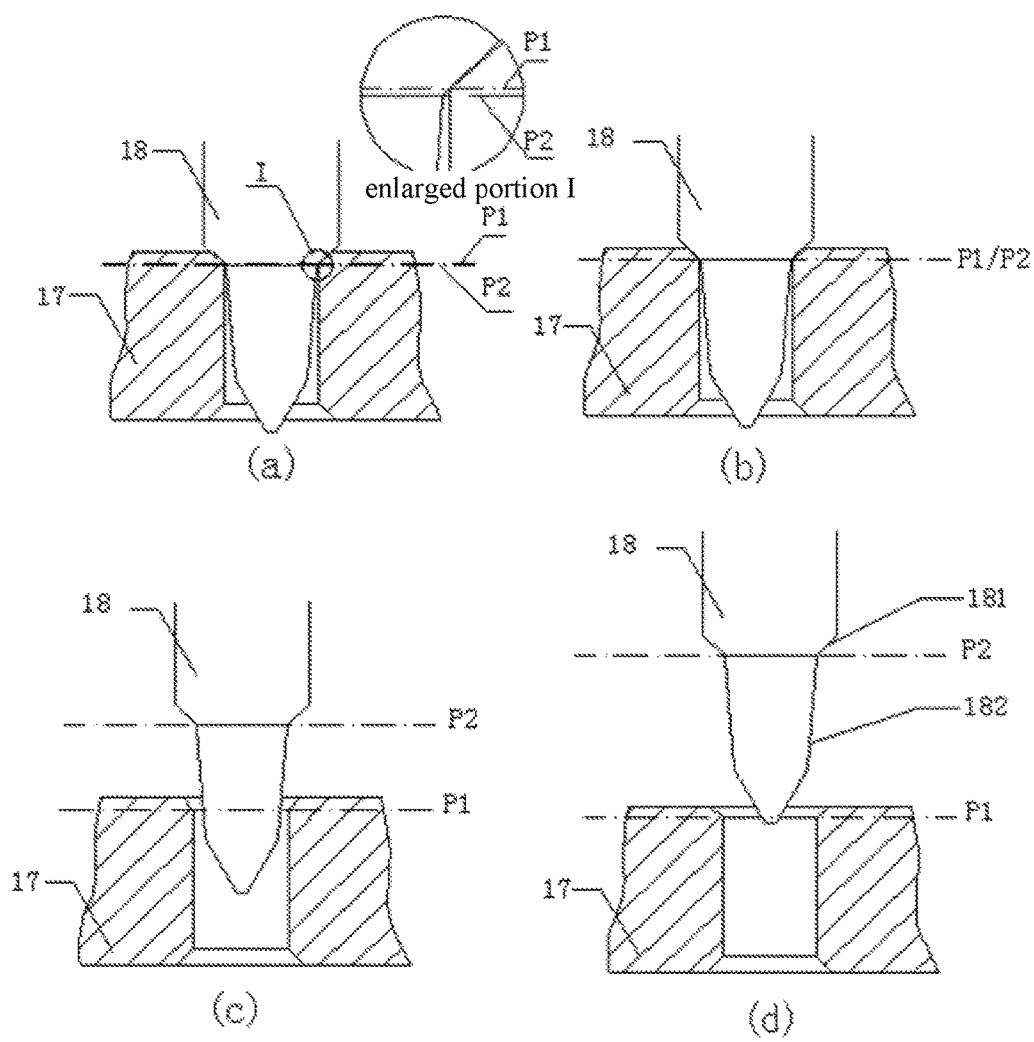
FIG. 1 is a schematic view showing a mating structure of a valve needle and a valve port during an opening process of a grooving type electronic expansion valve in the conventional technology.
Figure 2:
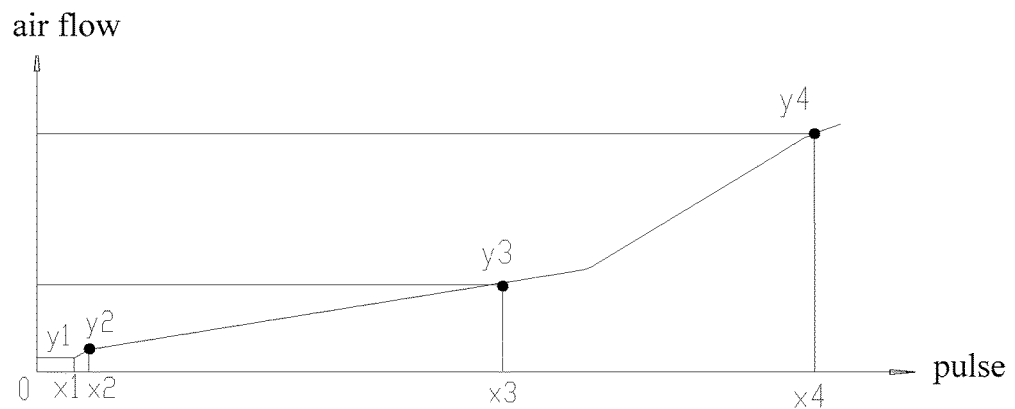
FIG. 2 is a flow curve to which the grooving type electronic expansion valve corresponds.
Figure 3:
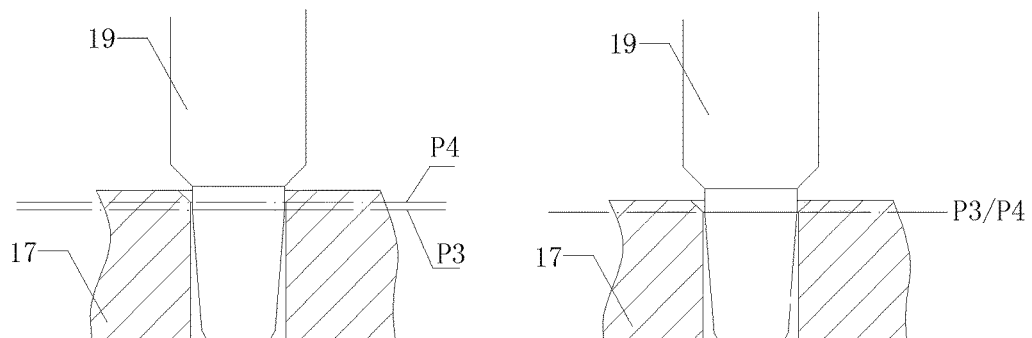
FIG. 3 is a schematic view showing a mating structure of a valve needle and a valve port during an opening process of a gap type electronic expansion valve in the conventional technology.
Figure 3:
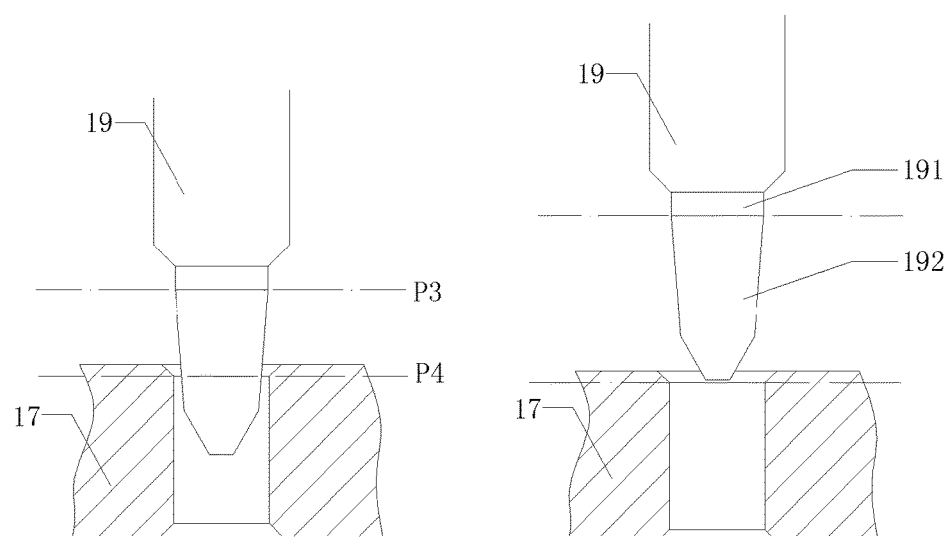
Figure 4:
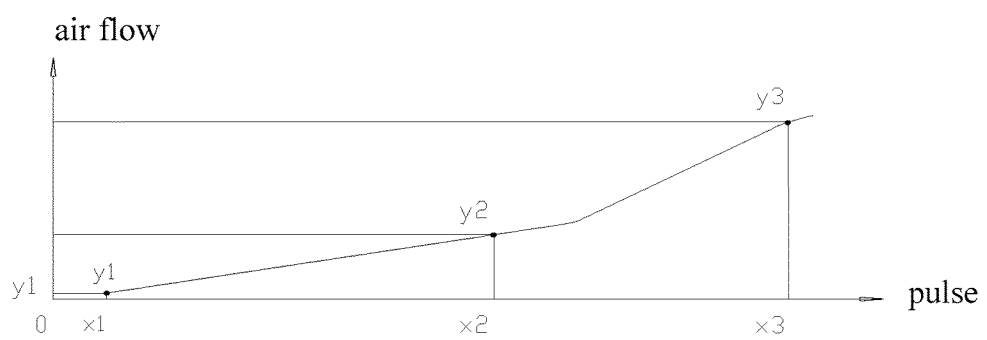
FIG. 4 is a flow curve to which the gap type electronic expansion valve corresponds.
Figure 5:
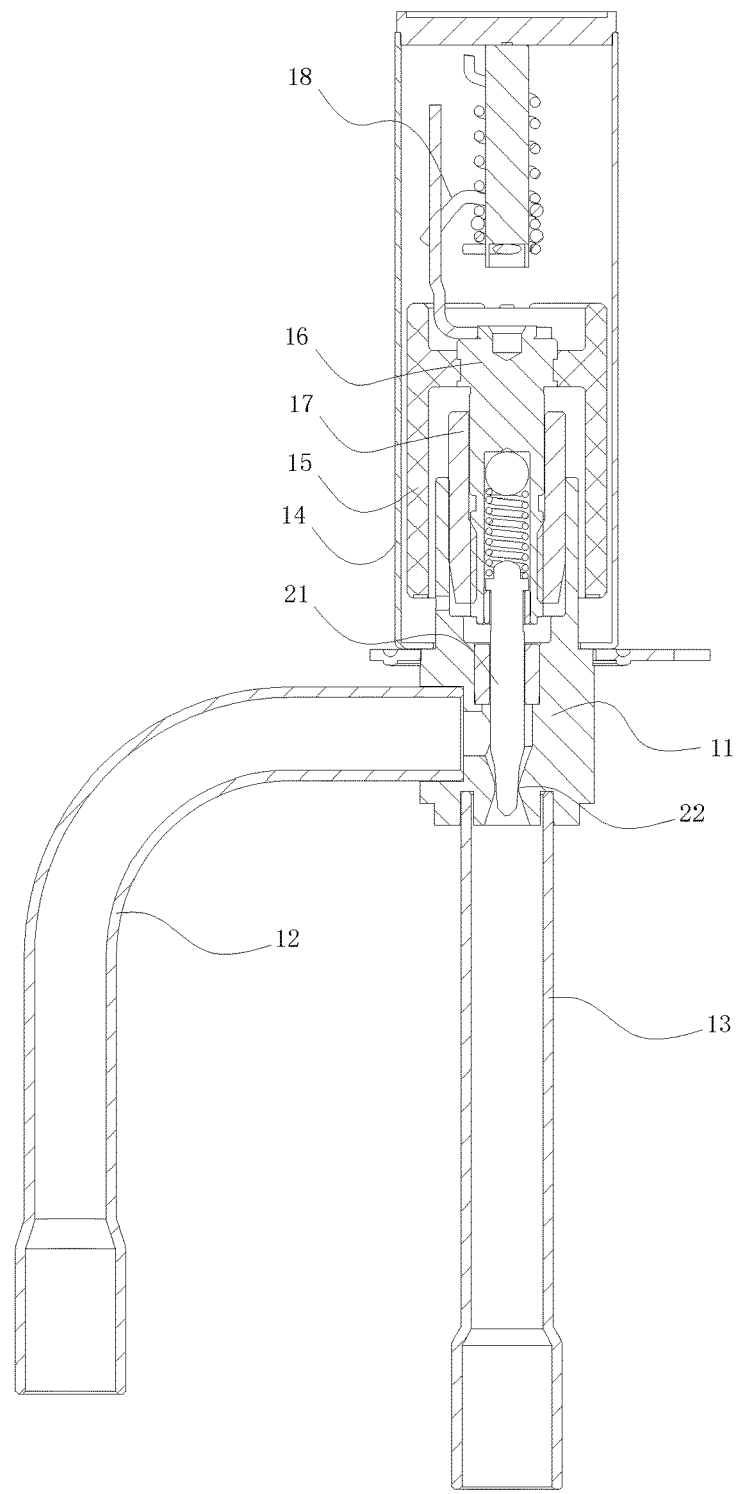
FIG. 5 is a schematic view showing the structure of an electronic expansion valve according to a first embodiment of the present application.
Figure 6:
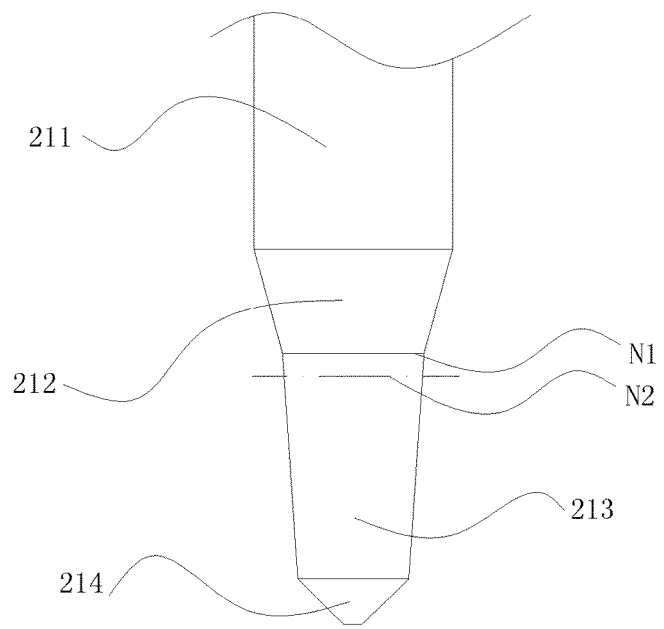
FIG. 6 is a schematic view showing the structure of a valve needle of the electronic expansion valve according to the first embodiment.

Reference is made to FIGS. 5 and 6. FIG. 5 is a schematic view showing the structure of an electronic expansion valve according to a first embodiment of the present application, and FIG. 6 is a schematic view showing the structure of a valve needle of the electronic expansion valve according to the first embodiment.

As shown in FIG. 5, an electronic expansion valve includes a valve body 1 and a coil (not shown in the figure). The valve body 1 includes a valve seat 11, and a first connecting pipe 12 and a second connecting pipe 13 which are connected to the valve seat 11 and used for the flowing of refrigerant. A housing 14 is fixedly connected on an upper portion of the valve seat 11. Inside the housing 14, a magnet rotor 15 which is rotatable in response to a signal of the coil, a lead screw 16 fixedly connected to the magnet rotor 15, and a nut 17 cooperating with the lead screw and converting a rotating motion of the lead screw into an upward and downward motion are provided. The lead screw 16 is connected to a valve needle 21, and the valve needle 21 realizes the opening and closing of the electronic expansion valve by cooperating with a valve port 22 arranged on the valve seat 11 during the upward and downward motion. For arranging a top dead center and a bottom dead center of the upward and downward motion of the valve needle, a stopping device 18 is further provided to limit the motion.

It should be noted that, the electronic expansion valve in FIG. 5 is merely a specific embodiment, and is introduced for the purpose of facilitating the explanation of the work principle of the electronic expansion valve. Various changes and improvements of the structure can be further made on the basis of the above work principle. The core of the present application is to provide a mating structure of the valve needle and the valve port of the electronic expansion valve, and the structure is suitable for any electronic expansion valves based on the above work principle. Therefore, the description of the structure of the above electronic expansion valve should not be interpreted as a limit to the scope of the present application.

The structure of the valve needle is described hereinafter in conjunction with FIG. 6.

Figure 9:
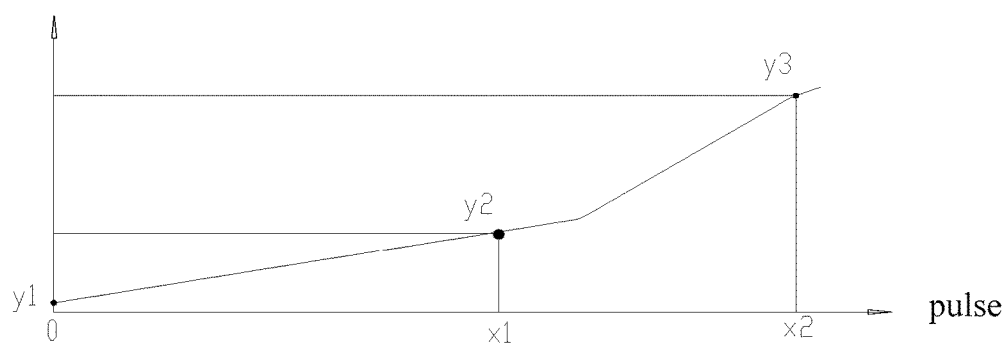
FIG. 9 is a flow curve of the electronic expansion valve according to the first embodiment.

The valve needle 21 includes a main body section 211 connected to the lead screw, a first valve needle conical surface 212 connected to the main body section 211, and a second valve needle conical surface 213 connected to the first valve needle conical surface 212, which are arranged adjacently in order. The first valve needle conical surface 212 is configured to cooperate with the valve port to determine a valve closing state and a zero pulse flow, and the first valve needle conical surface 212 and the second valve needle conical surface 213 jointly adjust the flow of the valve port. Both the first valve needle conical surface 212 and the second valve needle conical surface 213 have a conical surface structure, and the first valve needle conical surface 212 has a taper angle larger than a taper angle of the second valve needle conical surface 213. Thus, a boundary line is formed along a circumference at a boundary between the first valve needle conical surface 212 and the second valve needle conical surface 213, and a plane where the boundary line is located is defined as a first plane N1. A third valve needle conical surface 214 located at a bottom of the valve needle is used to control an inflection point between an X1 pulse and an X2 pulse of a flow curve as shown in FIG. 9.

Figure 7:
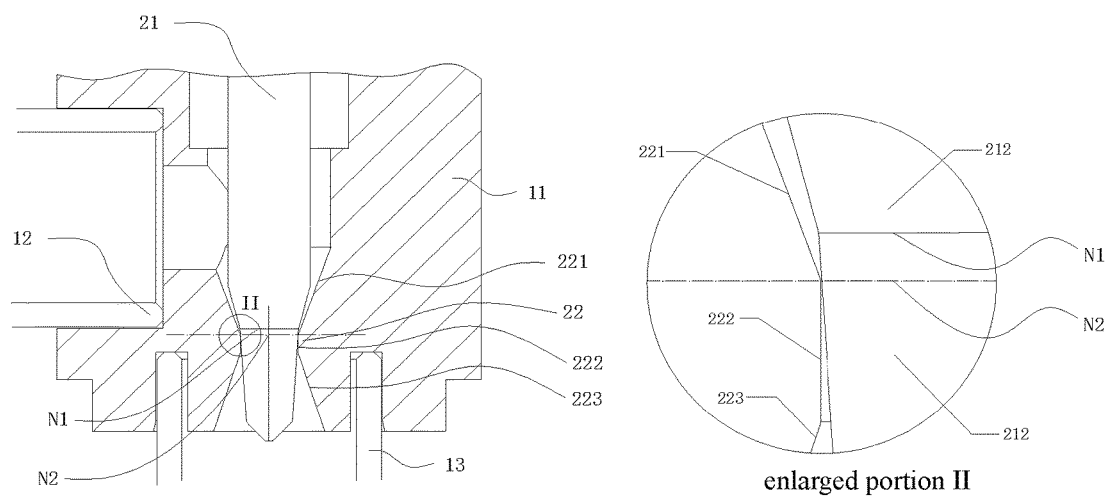
FIG. 7 is a schematic view showing a mating structure of the valve needle and a valve port when the electronic expansion valve according to the first embodiment is at a zero pulse.

FIG. 7 is a schematic view showing a mating structure of the valve needle 21 and the valve port 22 when the electronic expansion valve is at the zero pulse. The valve port 22 is generally of a tubular shape and includes a first valve port conical surface 221, a straight section portion 222 and a second valve port conical surface 223, which are arranged in sequence. The straight section portion 222 is generally of a cylindrical shape, and both the first valve port conical surface 221 and the second valve port conical surface 223 extend in a direction away from the axial direction of the straight section portion 222 and have inner diameters increased gradually, thus forming an inner conical surface shape. Similarly, a boundary line is also formed at a boundary between the first valve port conical surface 221 and the straight section portion 222, and for facilitating description, a plane where the boundary line is located is defined as a second plane N2, as shown in FIG. 7.

Figure 8:
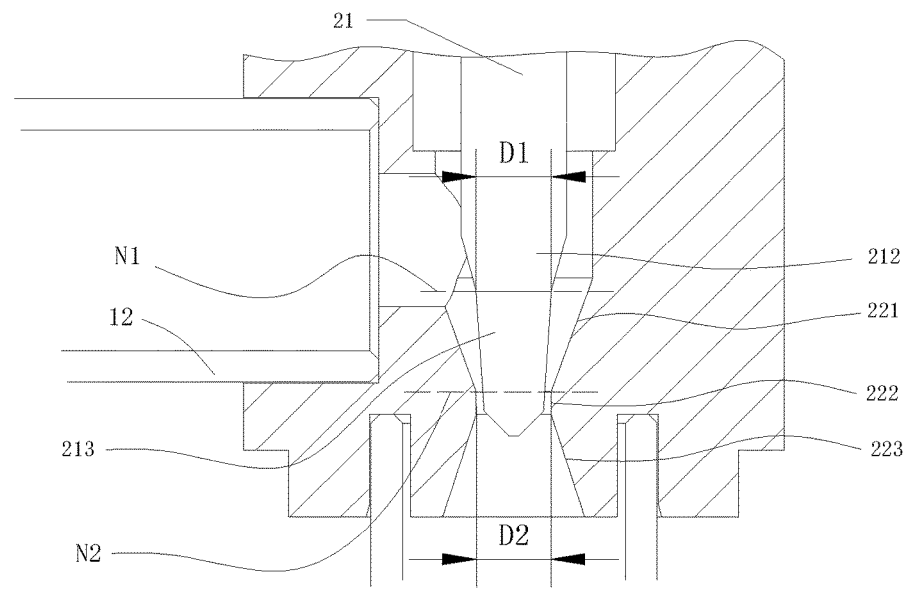
FIG. 8 is a schematic view showing a mating structure of the valve needle and the valve port when the electronic expansion valve according to the first embodiment is opened.

At the zero pulse, the first plane N1 is higher than the second plane N2. For the valve needle 21, an intersecting surface of the second plane N2 and the valve needle 21 is located on the second valve needle conical surface 213 of the valve needle 21. In this case, the first valve needle conical surface 212 is not in contact with the first valve port conical surface 221, and a section diameter D1 of the valve needle 21 in the first plane N1 is larger than a section inner diameter D2 of the valve port 22 in the second plane N2, thus an enough small flow can be made. The second valve needle conical surface 213 cooperates with the straight section portion 222, and the flow is adjusted by turning the valve needle 21. With the upward moving of the valve needle 21, the valve needle 21 reaches a position as shown in FIG. 8. A flow curve formed according to the above structure is shown in FIG. 9. The flow is greater than zero when the flow curve is at the zero pulse, and the curve rises by a certain slope until a position where the valve needle is fully opened. Therefore, the flow can be precisely adjusted when the electronic expansion valve is at a low pulse stage.

When the electronic expansion valve is assembled, a zero pulse position can be directly obtained by adjusting a relative position between the valve needle and the valve port and by using a flow meter. The flow meter is connected in a connecting pipe of the electronic expansion valve firstly, and the turning of the valve needle is controlled and a relative position between the valve needle and the valve port at the zero pulse is debugged, so as to allow the electronic expansion valve to have a certain initial flow. Thus, for the electronic expansion valve according to the present application, the flow accuracy at the zero pulse merely depends on a test accuracy of the flow meter and is not relevant to the manufacture accuracy of the valve needle and valve port, which can greatly improve the consistency of the zero pulse flow.

Since the section diameter D1 of the valve needle 21 in the first plane N1 (the largest diameter of the second valve needle conical surface) is larger than the section inner diameter D2 of the valve port 22 in the second plane N2 (an inner diameter of the straight section portion of the valve port). Theoretically, D1 can be designed to be infinitely approximate to D2. In other words, a gap between the valve needle and the valve port at the zero pulse can be infinitely reduced, that is, the zero pulse flow can be set to be infinitely small, which is especially suitable for some special refrigerating systems, for example, a R32 refrigerant, a refrigerator and a water heater, thus can enlarge the usage range of the electronic expansion valve.

For improving the consistency of the zero pulse flow, an angle of the second valve needle conical surface 213 can be set to be less than 15 degrees. If the angle is too large, inconsistency of the zero pulse flow can be increased. As shown in FIG. 7, when a valve body is fully closed, the valve port 22 is located below the first plane N1. During an opening process of the valve body, the valve port directly cooperates with the second valve needle conical surface 213 of the valve needle 21 to adjust the flow, and is not relevant to the first valve needle conical surface 212. Thus, a small opening degree area flow of the electronic expansion valve is controllable, and a small opening degree area is usable in a system.

For the electronic expansion valve according to this embodiment, the flow curve does not contain a section in which a flow value is constant. Therefore, the flow can be adjusted by making full use of a small pulse section, and thus an adjusting range of the electronic expansion valve is enlarged. When the valve needle is in a fully closed condition, the valve needle is not in contact with the valve port, thereby avoiding an abrasion of the valve needle and the valve port.

Other embodiments of the present application will be described hereinafter in conjunction with FIGS. 10 to 14. For facilitating the description of differences between other embodiments and the first embodiment, the components having the same structures and functions are indicated by the same reference numbers.

Embodiment 2

Figure 10:
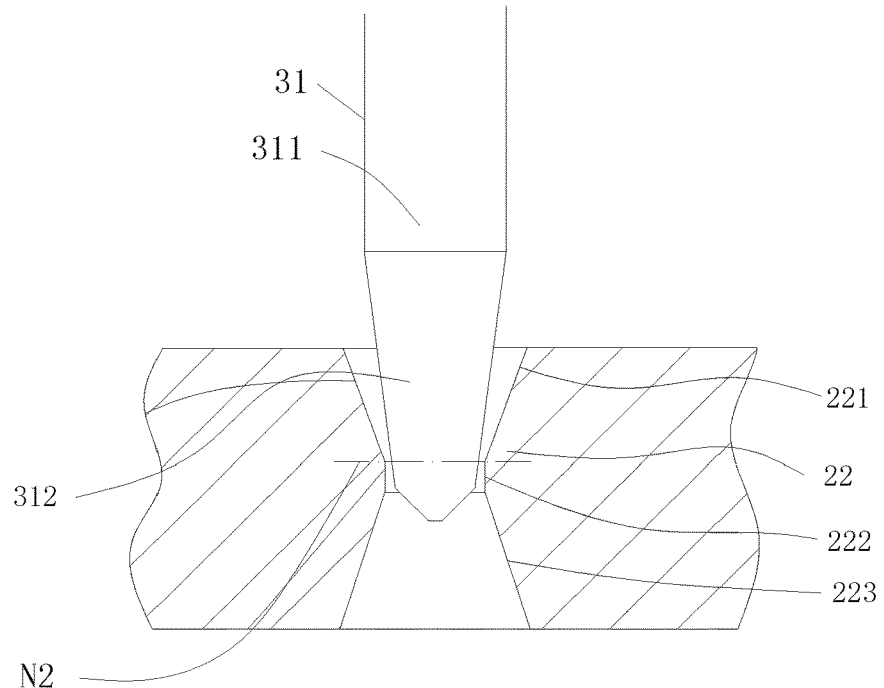
FIG. 10 is a schematic view showing a mating structure of a valve needle and a valve port of the electronic expansion valve according to the second embodiment.

Reference is made to FIG. 10, which is a schematic view showing the mating structure of a valve needle and a valve port of the electronic expansion valve according to a second embodiment.

In this embodiment, a valve port 22 has the same structure as the first embodiment, including a first valve port conical surface 221, a straight section portion 222 and a second valve port conical surface 223, which are arranged in sequence. The straight section portion 222 is generally cylindrical shaped, and both the first valve port conical surface 221 and the second valve port conical surface 223 extend in a direction away from the axial direction of the straight section portion 222 and have an inner diameter increased gradually, thus forming an inner conical surface shape. A boundary line is formed at a boundary between the first valve port conical surface 221 and the straight section portion, and a plane where the boundary line is located is defined as a second plane N2.

A valve needle 31 includes a main body portion 311 and a first conical surface portion 312 connected to the main body portion 311, and the largest diameter of the first conical surface portion 312 is larger than an inner diameter of the straight section portion 222. At a zero pulse position, an intersecting surface of the second plane N2 and the valve needle 31 is located at the first conical surface portion 312.

The method for adjusting a zero pulse position in this embodiment is the same as that in the first embodiment, which is not described herein.

Embodiment 3

Figure 11:
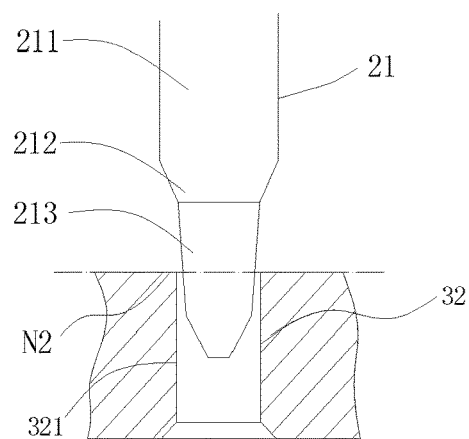
FIG. 11 is a schematic view showing a mating structure of a valve needle and a valve port of the electronic expansion valve according to the third embodiment.

FIG. 11 is a schematic view showing a mating structure of a valve needle and a valve port of the electronic expansion valve according to a third embodiment.

In this embodiment, a valve needle 21 has the same structure as the first embodiment, including a main body section 211 connected to a lead screw, a first valve needle conical surface 212 connected to the main body section 211 and a second valve needle conical surface 213 connected to the first valve needle conical surface 212. A third valve needle conical surface 214 can be arranged according to the requirement of flow adjustment.

A valve port 32 is a straight section portion 321 which is generally hollow cylindrical shaped, no conical surface portion is arranged, and the largest diameter of the second valve needle conical surface 213 is larger than an inner diameter of the straight section portion 321. A top of the valve port 32 defines a second plane N2, and an intersecting surface of the second plane N2 and the valve needle 21 is on the second valve needle conical surface 213 of the valve needle 21. In this embodiment, the method for adjusting a zero pulse position is the same as that in the first embodiment, which is not described herein.

Embodiment 4

Figure 12:
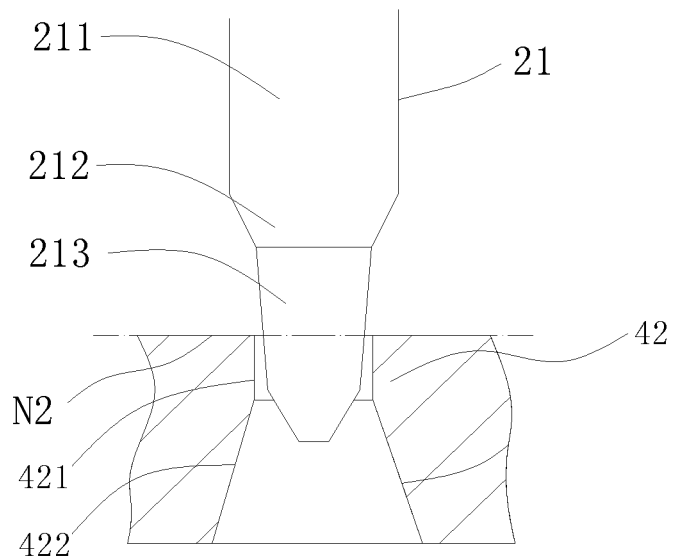
FIG. 12 is a schematic view showing a mating structure of a valve needle and a valve port according to the fourth embodiment.

FIG. 12 is a schematic view showing a mating structure of a valve needle and a valve port of the electronic expansion valve according to a fourth embodiment.

In this embodiment, a valve needle 21 has the same structure as the first embodiment, including a main body section 211 connected to a lead screw, a first valve needle conical surface 212 connected to the main body section 211 and a second valve needle conical surface 213 connected to the first valve needle conical surface 212.

A valve port 42 includes a straight section portion 421 which is generally hollow cylindrical shaped, and a conical surface portion 422 arranged adjacent to the straight section portion 421. An inner diameter of the straight section portion 421 is smaller than the largest diameter of the second valve needle conical surface portion 213. A top of the straight section portion 421 defines a second plane N2, and an intersecting surface of the second plane N2 and the valve needle 21 is on the second valve needle conical surface 213 of the valve needle 21.

Embodiment 5

Figure 13:
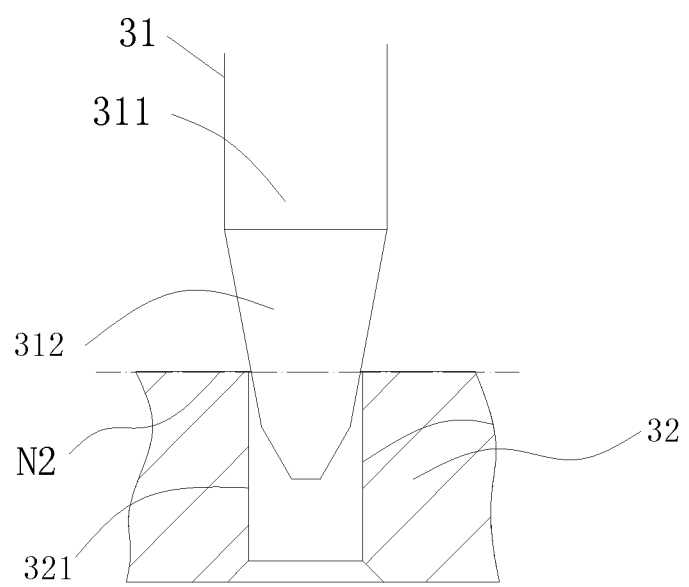
FIG. 13 is a schematic view showing a mating structure of a valve needle and a valve port of the electronic expansion valve according to the fifth embodiment.

FIG. 13 is a schematic view showing a mating structure of a valve needle and a valve port of the electronic expansion valve according to a fifth embodiment.

In this embodiment, a valve port 32 has the same structure as that in the third embodiment, and is a straight section portion 321 which is generally hollow cylindrical shaped, no conical surface portion is provided, and a top of the valve port defines a second plane N2 in this embodiment. A valve needle 31 has the same structure as that in the second embodiment, including a main body portion 311 and a first conical surface portion 312 connected to the main body portion 311, and the largest diameter of the first conical surface portion 312 is larger than an inner diameter of the straight section portion 321.

At a zero pulse position, an intersecting surface of the second plane N2 and the valve needle 31 is on the first conical surface portion 312. An intersecting surface of the second plane N2 and the valve needle 21 is on the second valve needle conical surface 213 of the valve needle 21.

Embodiment 6

Figure 14:
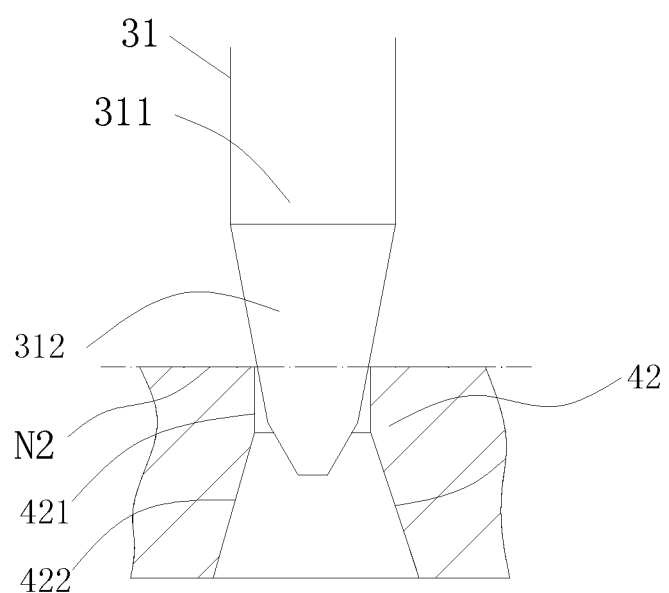
FIG. 14 is a schematic view showing a mating structure of a valve needle and a valve port of the electronic expansion valve according to the sixth embodiment.
Figure 15:
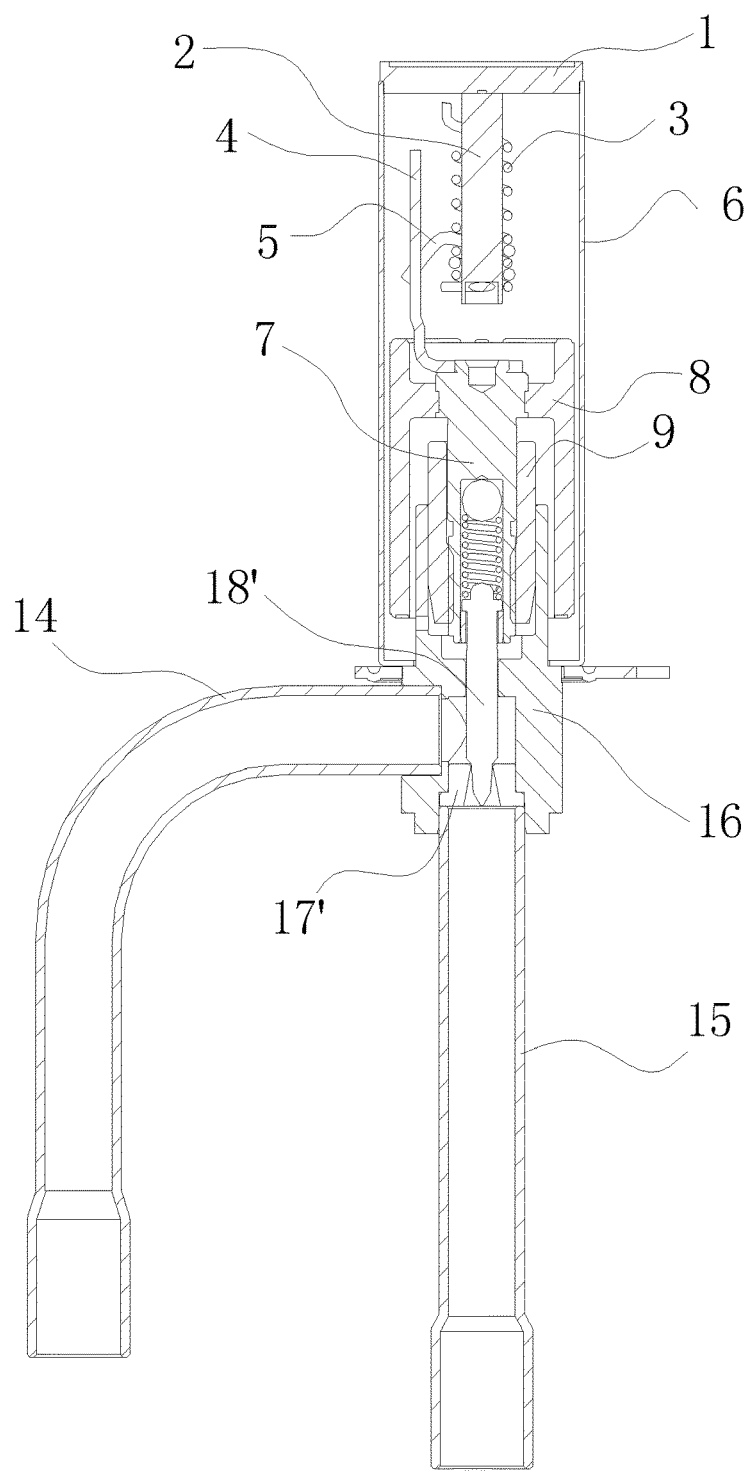
FIG. 15 is a schematic view showing the structure of a typical electronic expansion valve in the conventional technology.
Figure 16:
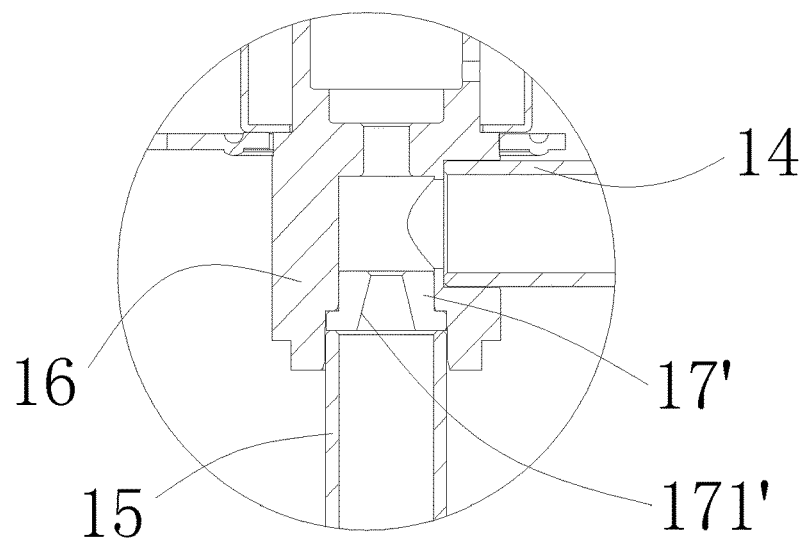
FIG. 16 is a partially enlarged view of a valve port portion of the electronic expansion valve in FIG. 15.

FIG. 14 is a schematic view showing a mating structure of a valve needle and a valve port of the electronic expansion valve according to a sixth embodiment.

Having the same structure as that in the fourth embodiment, a valve port 42 includes a straight section portion 421 which is generally hollow and cylindrical shaped and a conical surface portion which is arranged adjacently to the straight section portion 421, and a top of the straight section portion 421 defines a second plane N2 in this embodiment.

Having the same structure as that in the second embodiment, a valve needle 31 includes a main body portion 311 and a first conical surface portion 312 connected to the main body portion 311, and the largest diameter of the first conical surface portion 312 is larger than an inner diameter of the straight section portion 421. An intersecting surface of the second plane N2 and the valve needle 21 is on the second valve needle conical surface 213 of the valve needle 21.

It should be supplementally explained that, in the above embodiments, a bottom end of the valve needle is further provided with an end portion which is cone shaped and is configured to control whether an inflection point exists between an X1 pulse and an X2 pulse in the flow curve as shown in FIG. 9. However, it has small effect on the flow adjustment to low pulse phase and thus it is not described in detail in the above embodiments.

Figure 17:
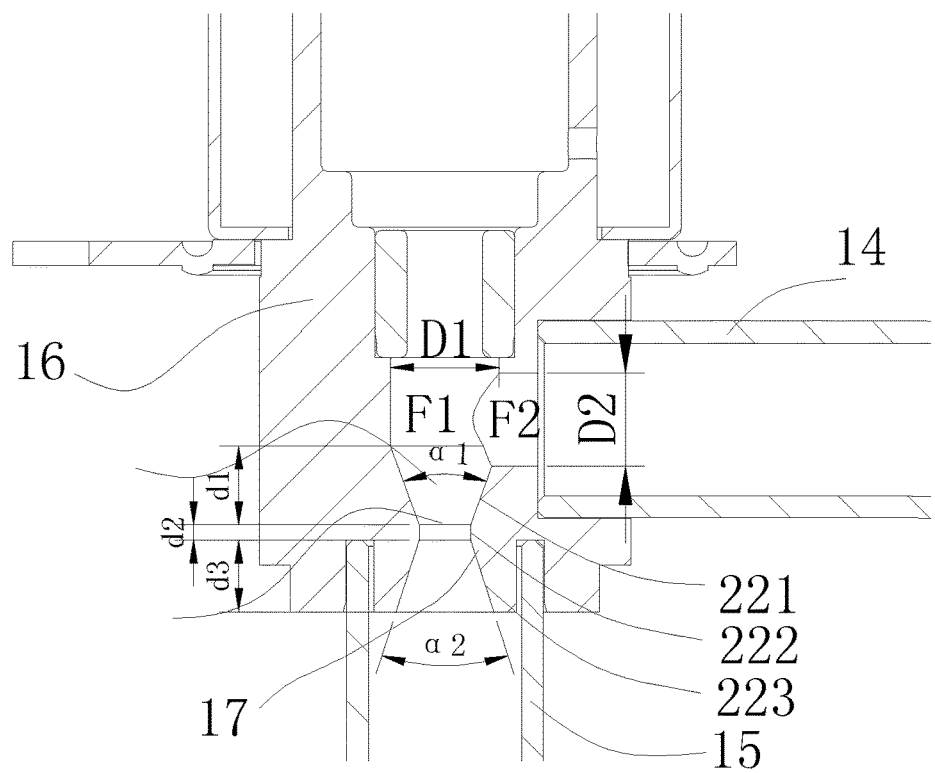
FIG. 17 is a partially enlarged view of a valve port portion of an electronic expansion valve according to the present application.
Figure 18:
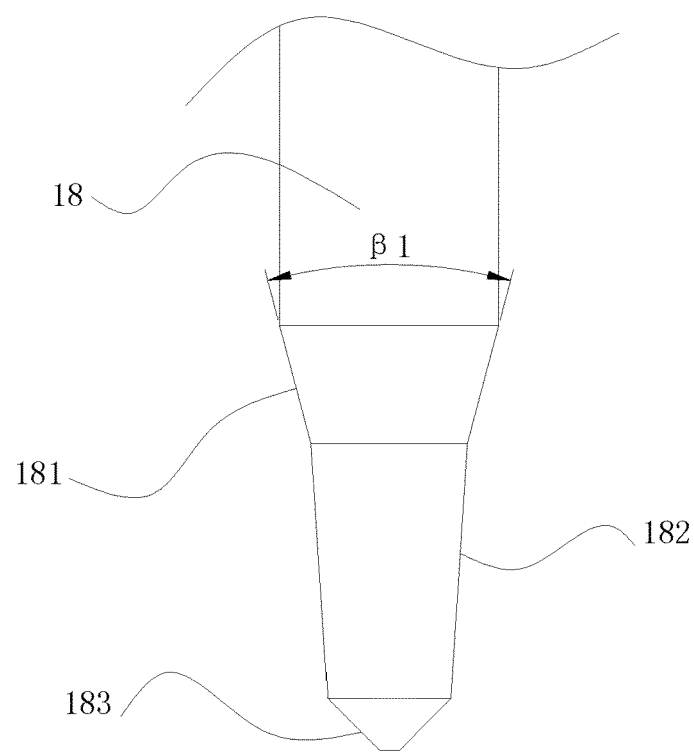
FIG. 18 is a s schematic view showing the structure of a valve needle of the electronic expansion valve according to the present application.

Reference is made to FIG. 17, which is a partially enlarged view of a valve port portion of an electronic expansion valve according to the present application.

It should be noted that, in the present application, the mating structure of the valve needle and the valve port in the conventional technology is improved. Other components of the electronic expansion valve, such as the magnet rotor, the lead screw, the nut, the stopping device and so on can adopt the structures in the conventional technology or can adopt other electronic expansion valve structures which can realize the same functions. The structures of the above components are not limited by the present application, and based on the technical solutions according to the present application, those skilled in the art can apply the technical solutions to the structures of all types of electronic expansion valves.

For facilitating the description of the technical solution of the present application, a component having the same structure as a component in the conventional technology uses the same reference number.

As shown in FIG. 17, a valve seat 16 is provided with a valve port 17. In this embodiment, the valve port 17 is formed by directly machining the valve seat 16. The valve port 17 includes a first valve port conical surface 221, a straight section portion 222 and a second valve port conical surface 223. The first valve port conical surface 221 and the second valve port conical surface 223 are respectively arranged on two ends of the straight section portion 222 and extend in a direction away from the straight section portion 222. A conical surface inner diameter gradually increases at a certain taper in the extending direction.

A taper angle $\alpha 1$ of the first valve port conical surface 221 is set to be within a range of $50°\pm 20°$. In the case that the taper angle is too small, the largest flow of the product may be adversely affected. In the case that the taper angle is too large, the noise reduction effect in the present application is not remarkable.

In an electronic expansion valve which is fully closed and allows no flow (that is, the valve needle contacts with a valve port to make the electronic expansion be in a closed state and there is no fluid flowing out), the taper angle of first valve port conical surface 221 is further limited to range from $50°$ to $70°$. This is because that a too small taper angle may result in a self-locking phenomenon between the valve needle and the valve port, which may adversely affect the action performance of the electronic expansion valve.

A taper angle $\alpha 2$ of the second valve port conical surface 223 is set to be within a range of $36°\pm 20°$. If the taper angle is too large, the noise reduction effect is too poor. If the taper angle is too small, the largest diameter of the second valve port conical surface 223 having the same length maybe too small and has a too large difference from an inner diameter of the connecting pipe, thus may still causing a refrigerant noise.

Figure 20:
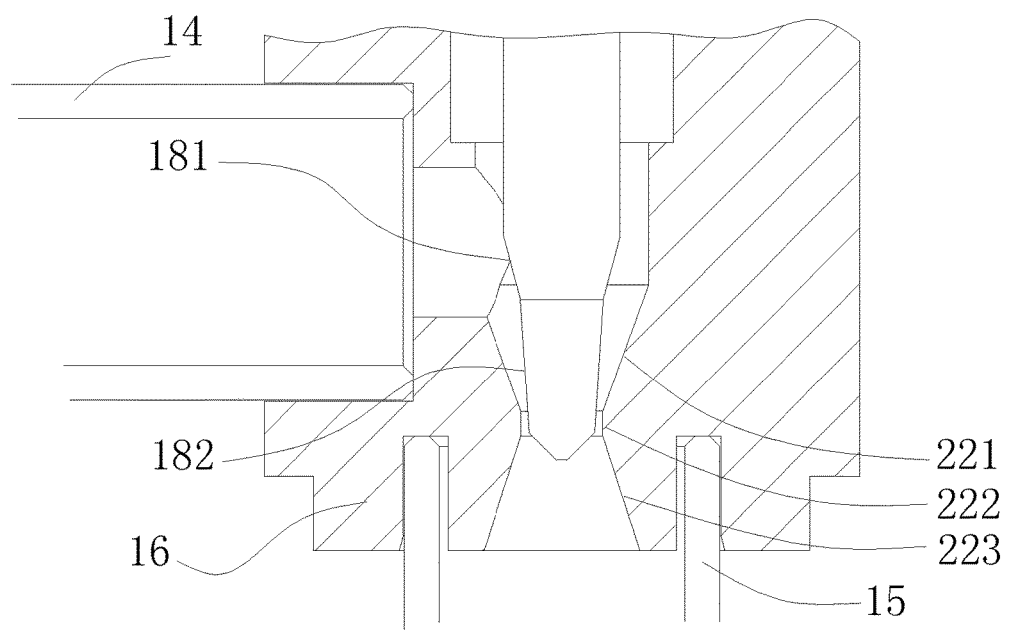
FIG. 20 is a schematic view showing a mating structure of a valve needle and a valve port when the electronic expansion valve according to the present application is in an opened state.

In addition, referring to FIG. 20, the valve needle 18 includes a first conical surface 181, a second conical surface 182 and a third conical surface 183 which are arranged at a lower end portion of the valve needle 18 in sequence. The first conical surface 181 is configured to cooperate with a first valve port conical surface 221 on the valve port, and a conical angle β1 of the first conical surface 181 is smaller than the conical angle α1 of the first valve port conical surface 221 by 20°±10°, namely, satisfying the relationship: α1−β1=20°±10°; if this taper angle difference is too small, not only the largest flow may be limited, but also a friction force between the first conical surface 181 and the first valve port conical surface 221 on the valve port may be increased; if this taper angle difference is too large, not only the noise reduction effect may be adversely affected, but also the abrasion between the first conical surface 181 and the first valve port conical surface 221 on the valve port may be aggravated. The third conical surface 183 can be arranged according to the requirement of flow characteristic or can also not be provided. Also for the electronic expansion valve which is fully closed and has no flow, the angle of β1 ranges from 40° to 60°. If the angle decreases further, the self-locking phenomenon between the valve needle and the valve port occurs, which adversely affects the motion performance of the electronic expansion valve.

For further reducing the noise generated by the fluid, the valve seat 16 is provided with a first chamber F1 and a second chamber F2. The first chamber F1 is generally hollow and cylinder shaped and has an inner diameter which may be set to be equal to the largest inner diameter of the first valve port conical surface 221, so that a conical chamber formed by the first chamber F1 and the first valve port conical surface 221 is smoothly transited and noise generated when the fluid flows between the two chambers can be decreased.

Furthermore, the second chamber F2 is arranged at a lateral side of the valve seat 16 and has an axis coincident with a center axis of the first connecting pipe 14. In the case that the fluid flows into the electronic expansion valve via the first connecting pipe 14, the fluid flows through the second chamber F2, enters an inner chamber of the valve seat 16, and then flows through the valve port 17 to flow into the second connecting pipe 15.

In this embodiment, an inner diameter D1 of the first chamber F1 is set to be approximately equal to an inner diameter D2 of the second chamber F2, and a cross sectional area S1 of the first chamber F1 and a cross sectional area S2 of the straight section portion 222 of the valve port meet the relationship: $2 \leq S1/S2 \leq 5$.

A height d1 of the first valve port conical surface 221 can be set to be approximately equal to a height d3 of the second valve port conical surface 223, and a ratio between, the height d1 or the height d3, and a height d2 of the straight section portion 222 meet the following relationships: $2 \leq d1/d2 \leq 10$, or $2 \leq d3/d2 \leq 10$.

If the height of the first valve port conical surface 221 is too small, the noise reduction effect is not obvious, and if this height is further increased, the noise reduction effect may not be improved linearly while the manufacturing cost may sharply increase.

Figure 19:
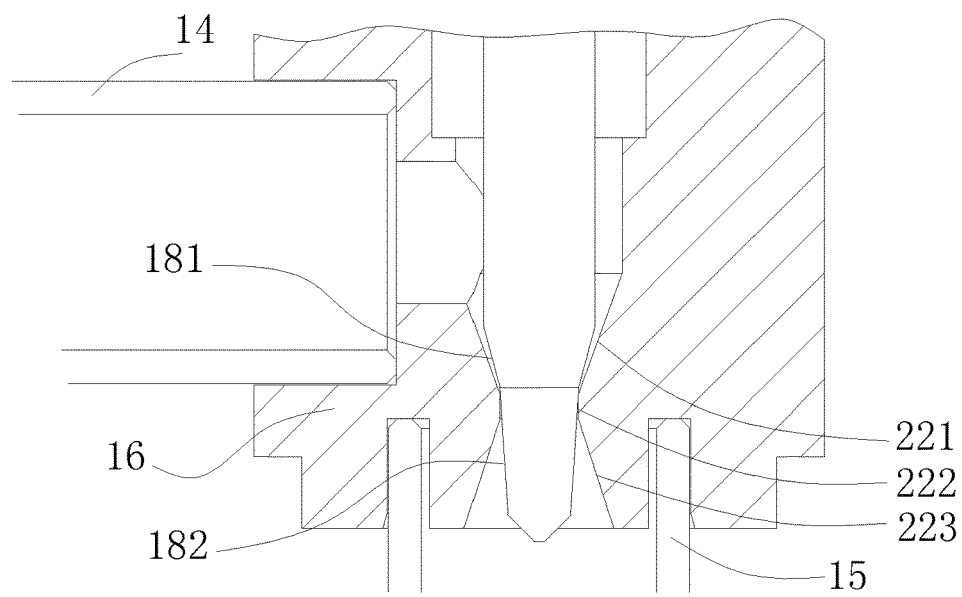
FIG. 19 is a schematic view showing a mating structure of a valve needle and a valve port when the electronic expansion valve according to the present application is in a closed state.

In this embodiment, during the process of the valve needle leaving the valve port and reaching a fully opened state, as shown in FIGS. 19 and 20, flow channels having an annular cross section are formed between the first conical surface 181 of the valve needle and the first valve port conical surface 221 of the valve port, and areas of the annular flow channels gradually increase from the valve port to the inner chamber of the valve seat. Thus, the first valve port conical surface 221 can make the flow areas from the valve port to the inner chamber of the valve seat to smoothly change, and the flow area does not change suddenly when the fluid passes through the valve port, thus restraining the bubbles from being generated to the utmost extent and reducing the noise.

The electronic expansion valve provided by the present application is described in detail hereinbefore. The principle and the embodiments of the present application are illustrated herein by specific examples. The above description of examples is only intended to help the understanding of the method and the spirit of the present application. It should be noted that, for those skilled in the art, many modifications and improvements may be made to the present application without departing from the principle of the present application, and these modifications and improvements are also deemed to fall into the protection scope of the present application defined by the claims.

What is claimed is:

1. An electronic expansion valve, comprising:
an electromagnetic coil configured to apply a pulse to allow the electronic expansion valve to operate in response to the pulse;
a valve body provided with a valve port; and
a valve needle configured to cooperate with the valve port to adjust a flow of the electronic expansion valve;
wherein the valve needle comprises a main body section and a first conical surface portion which is arranged adjacent to the main body section,
wherein the valve port comprises a straight section portion having equal diameters; and
wherein when the electromagnetic coil applies a zero pulse for a zero pulse position of the valve needle, the flow is the smallest but is greater than zero, the straight section portion is not in contact with the valve needle, and an intersecting surface of a second plane and the valve needle are on the first conical surface portion, and, a top end of the straight section portion is located on the second plane.

2. The electronic expansion valve according to claim 1, wherein the valve port further comprises a first valve port conical surface and a second valve port conical surface, which are arranged at two ends of the straight section portion respectively, extend in a direction away from an axial direction of the straight section portion and have inner diameters increased gradually.

3. The electronic expansion valve according to claim 2, wherein a boundary line between the first valve port conical surface and the straight section portion is located on the second plane.

4. The electronic expansion valve according to claim 1, wherein the largest diameter of the first conical surface portion is larger than an inner diameter of the straight section portion.

5. An electronic expansion valve, comprising:
an electromagnetic coil configured to apply a pulse to allow the electronic expansion valve to operate in response to the pulse;
a valve body provided with a valve port; and
a valve needle configured to cooperate with the valve port to adjust a flow of the electronic expansion valve;
wherein the valve needle comprises a main body section, a first valve needle conical surface and a second valve needle conical surface, which are adjacently arranged in sequence, wherein the first valve needle conical surface has a taper angle larger than a taper angle of the second valve needle conical surface, wherein the valve port comprises a straight section portion having equal diameters, and wherein when the electromagnetic coil applies a zero pulse for a zero pulse position of the valve needle, a flow is the smallest but is greater than zero, the straight section portion is not in contact with the valve needle, and an intersecting surface of a second plane and the valve needle is on the second valve needle conical surface, and a top end of the straight section portion is located on the second plane.

6. The electronic expansion valve according to claim 5, wherein the valve port further comprises a first valve port conical surface and a second valve port conical surface, which are arranged at two ends of the straight section portion respectively, extend in a direction away from an axial direction of the straight section portion and have inner diameters increased gradually; and a boundary line between the first valve port conical surface and the straight section portion is located on the second plane.

7. The electronic expansion valve according to claim 5, wherein the largest diameter of the second valve port conical surface is larger than an inner diameter of the straight section portion.

8. The electronic expansion valve according to claim 5, wherein the valve port further comprises a conical surface portion, and the largest diameter of the second valve needle conical surface is larger than an inner diameter of the straight section portion of the valve port.

9. The electronic expansion valve according to claim 1, wherein the valve port further comprises conical surface portion.

10. The electronic expansion valve according to claim 1, wherein the valve port comprises a first valve port conical surface, the straight section portion and a second valve port conical surface, which are arranged in sequence; and a height of the first valve port conical surface and a height of the straight section portion meet the relationship: $2 \leq d1/d2 \leq 10$, where $d1$ is the height of the first valve port conical surface and $d2$ is the height of the straight section portion.

11. The electronic expansion valve according to claim 10, wherein a height of the second valve port conical surface and the height of the straight section portion meet the relationship: $2 \leq d3/d2 \leq 10$, where $d3$ is the height of the second valve port conical surface and $d2$ is the height of the straight section portion.

12. The electronic expansion valve according to claim 10, wherein the first valve port conical surface and the second valve port conical surface are respectively arranged at two ends of the straight section portion, extend in a direction away from an axial direction of the straight section portion, and have inner diameters increased gradually.

13. The electronic expansion valve according to claim 12, wherein a taper angle of the first valve port conical surface is within a range of $50°\pm20°$.

14. The electronic expansion valve according to claim 13, wherein the taper angle of the first valve port conical surface ranges from $50°$ to $70°$.

15. The electronic expansion valve according to claim 12, wherein a taper angle of the second valve port conical surface is within a range of $36°\pm20°$.

16. The electronic expansion valve according to claim 10, wherein the valve needle comprises a first conical surface and a second conical surface; the first conical surface cooperates with the first valve port conical surface of the valve port and meets the relationship: $\alpha1-\beta1=20°\pm10°$, where $\alpha1$ is the taper angle of the first valve port conical surface of the valve port and $\beta1$ is the taper angle of the first conical surface of the valve needle.

17. The electronic expansion valve according to claim 10, wherein a valve seat is provided with a first chamber and a second chamber, the first chamber is adjacent to the first valve port conical surface, and an inner diameter of the first chamber is equal to the largest inner diameter of the first valve port conical surface.

18. The electronic expansion valve according to claim 17, wherein an inner diameter of the first chamber is approximately equal to an inner diameter of the second chamber, and a cross sectional area of the first chamber and a cross sectional area of the straight section portion meet the relationship: $2 \leq S1/S2 \leq 5$, where $S1$ is the cross-sectional area of the first chamber and $S2$ is the cross-sectional area of the straight section portion.

19. The electronic expansion valve according to claim 16, wherein during a process of the valve needle moving away from the valve port by at least 250 pulses, a flow channel having an annular cross section is formed between the first valve port conical surface and the first conical surface.

* * * * *